(12) United States Patent
Campbell

(10) Patent No.: US 8,057,315 B2
(45) Date of Patent: Nov. 15, 2011

(54) SHAFT ASSEMBLY

(75) Inventor: Craig A. Campbell, Auburn Hills, MI (US)

(73) Assignee: GKN Driveline North America, Inc., Auburn Hills, MI (US)

( * ) Notice: Subject to any disclaimer, the term of this patent is extended or adjusted under 35 U.S.C. 154(b) by 764 days.

(21) Appl. No.: 12/097,221

(22) PCT Filed: Dec. 13, 2006

(86) PCT No.: PCT/US2006/047549
§ 371 (c)(1),
(2), (4) Date: Jun. 12, 2008

(87) PCT Pub. No.: WO2007/070582
PCT Pub. Date: Jun. 21, 2007

(65) Prior Publication Data
US 2008/0293504 A1 Nov. 27, 2008

Related U.S. Application Data

(60) Provisional application No. 60/749,950, filed on Dec. 13, 2005.

(51) Int. Cl.
*F16C 3/02* (2006.01)
(52) U.S. Cl. .................................................. 464/180
(58) Field of Classification Search .................. 464/127, 464/180, 182, 183; 188/378–380
See application file for complete search history.

(56) References Cited

U.S. PATENT DOCUMENTS

| | | | | |
|---|---|---|---|---|
| 170,711 A | * | 12/1875 | Chase et al. | 464/183 |
| 835,215 A | * | 11/1906 | Coates | 464/182 |
| 2,761,296 A | * | 9/1956 | Baker | 464/180 |
| 4,487,123 A | * | 12/1984 | Kobler et al. | 464/180 |
| 6,792,660 B1 | * | 9/2004 | Breese | 464/180 |
| 6,986,713 B2 | * | 1/2006 | Dine et al. | 464/183 |
| 2005/0043104 A1 | | 2/2005 | Dine et al. | |

FOREIGN PATENT DOCUMENTS

| | | |
|---|---|---|
| DE | 10040674 A1 | 3/2002 |
| DE | 10040674 A1 * | 3/2002 |
| FR | 2776036 A1 | 9/1999 |

OTHER PUBLICATIONS

PCT International Search Report No. PCT/US2006/047549 dated May 7, 2007.

* cited by examiner

*Primary Examiner* — Gregory Binda
*Assistant Examiner* — Josh Skroupa
(74) *Attorney, Agent, or Firm* — Jennifer M. Brumbaugh; Mick A. Nylander; Rader, Fishman & Grauer PLLC

(57) ABSTRACT

A shaft assembly, comprising: a generally hollow shaft having first and second ends and at least one internal tube positioned within the shaft so as to be adapted to be placed under tension to control the natural frequency of the shaft. The shaft assembly has a predetermined length and the series of internal tubes has a cumulative length that is greater than the predetermined length of the shaft.

10 Claims, 3 Drawing Sheets

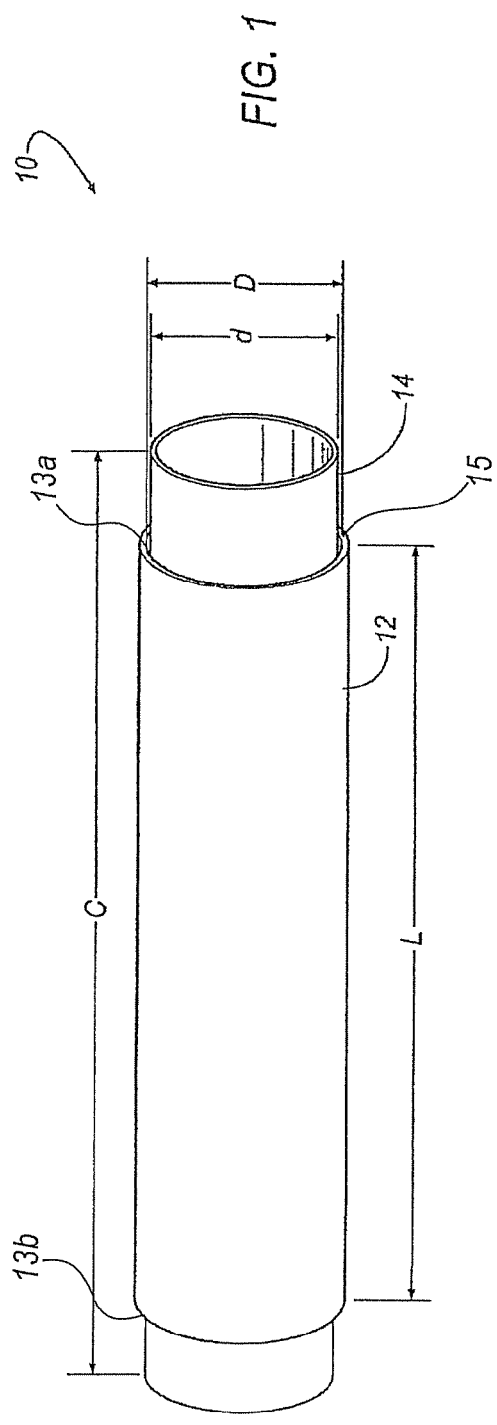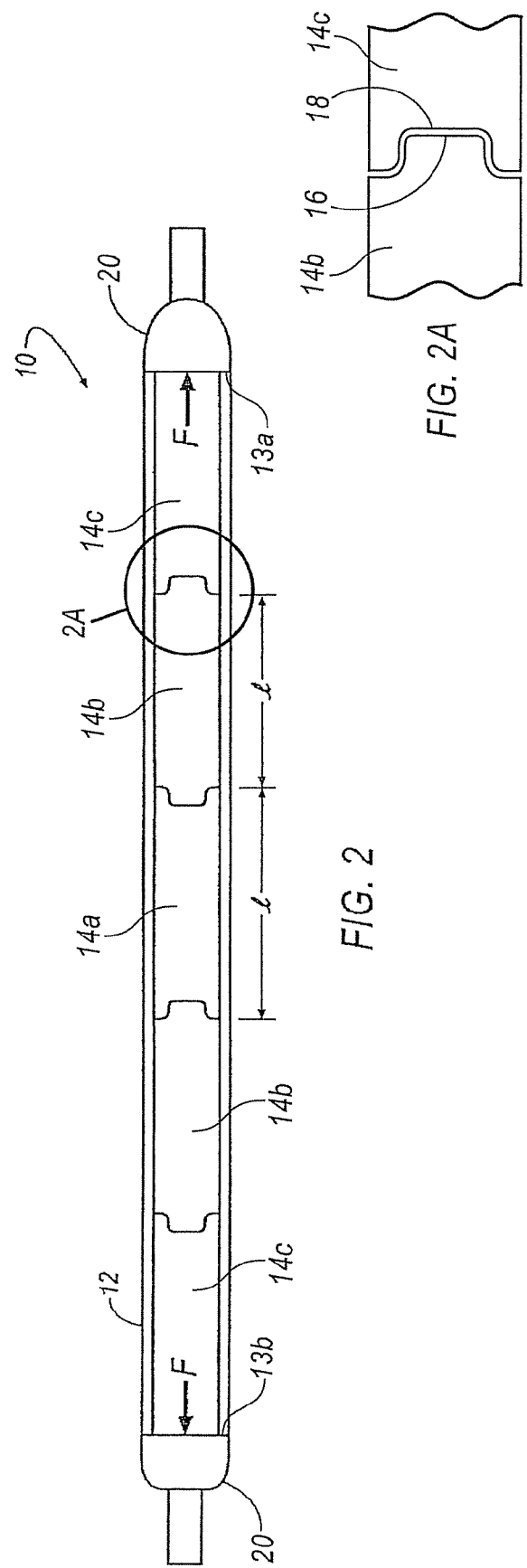

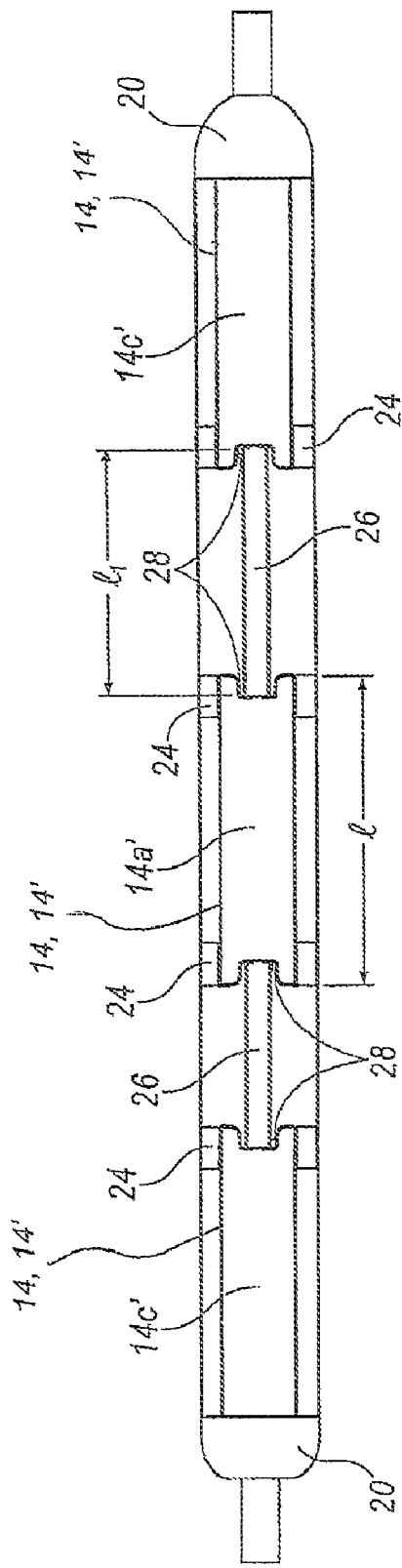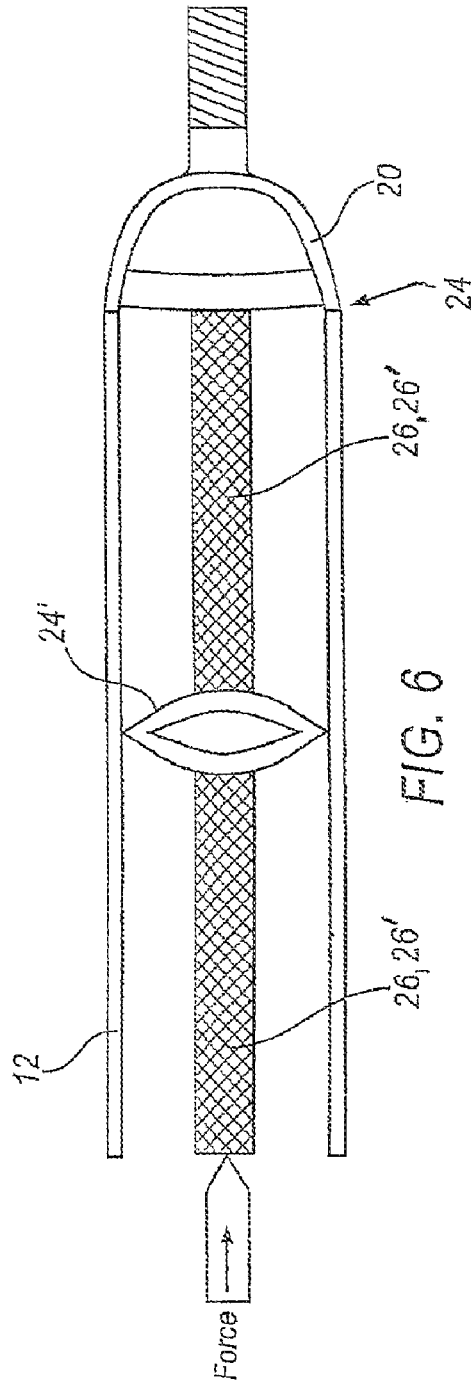
FIG. 5
FIG. 6

SHAFT ASSEMBLY

CROSS-REFERENCE TO RELATED APPLICATIONS

This application is a National Phase application related to PCT/US06/047549, which was filed on Dec. 13, 2006, which application claims priority to U.S. Provisional Application No. 60/749,950 filed on Dec. 13, 2005, which applications are incorporated herein by reference in their entirety.

TECHNICAL FIELD

The present disclosure generally relates to an internal propeller shaft-tensioning device.

BACKGROUND

Driveline systems, also referred to as power train systems, deliver power to different combinations of drive wheels, such as, for example front drive wheels, rear drive wheels, or some combination thereof. In some systems, drivelines permit the driven wheels to rotate at different speeds. For example, the outside wheels must rotate faster than the inside drive wheels, and front drive wheels must normally rotate faster than the rear wheels.

A representative driveline lines system for a rear wheel or all wheel drive vehicle, for example, incorporates one or more constant velocity joint to connect a pair of front and rear propeller shafts ("propshafts") to transfer torque from a power take off unit to a rear drive line module. However, at certain rotational speeds and resonant frequencies, the propshafts are known to exhibit unbalanced rotation, creating undesirable vibrations. These vibrations, are known to result in bending or torsional forces within and along the length of the respective propeller shaft. Such bending and torsional forces are neither desirable nor suitable in the operation of the driveline system.

In some instances, it has been known to employ dynamic dampers and mass dampers to suppress undesirable vibrations. Such dampers are installed or inserted directly onto the rotary driveshafts. The dampers transfers and absorbs the vibrational energy of the rotary propeller shaft by generating a prescribed vibrational frequency adjusted to the dominant frequency of the vibrations. The dynamic damper thus cancels or negates vibrations that are induced onto or caused by the rotary propshaft in normal operation of the propshaft of the vehicle. However, the use of such dampers does not address or increase, the threshold resonant frequency at which harmful bending of the propshaft will occur.

Thus, there exists a need for a propshaft assembly that minimizes or even negates undesirable vibrations caused by unbalanced rotation, but also increases the resonant frequency of bending of the driveshaft itself.

SUMMARY

A shaft assembly is disclosed. The shaft assembly includes a generally hollow shaft having first and second ends and at least internal tube positioned within the shaft so as to be adapted to be placed under tension to control the natural frequency of the shaft.

BRIEF DESCRIPTION OF THE DRAWINGS

FIG. 1 is a perspective view of a propeller shaft assembly according to an unloaded embodiment.

FIG. 2 is a cross-sectional view of the propeller shaft assembly of FIG. 1 in tension.

FIG. 2a is a partially exploded blow up of encircled area 2a taken from FIG. 2.

FIG. 5 is a cross-sectional view of a fourth embodiment of the propeller shaft assembly of FIG. 1, in tension.

FIG. 6 is a partial cross-sectional view of a fifth embodiment of the propeller shaft assembly of FIG. 1.

DETAILED DESCRIPTION

Figure 3:
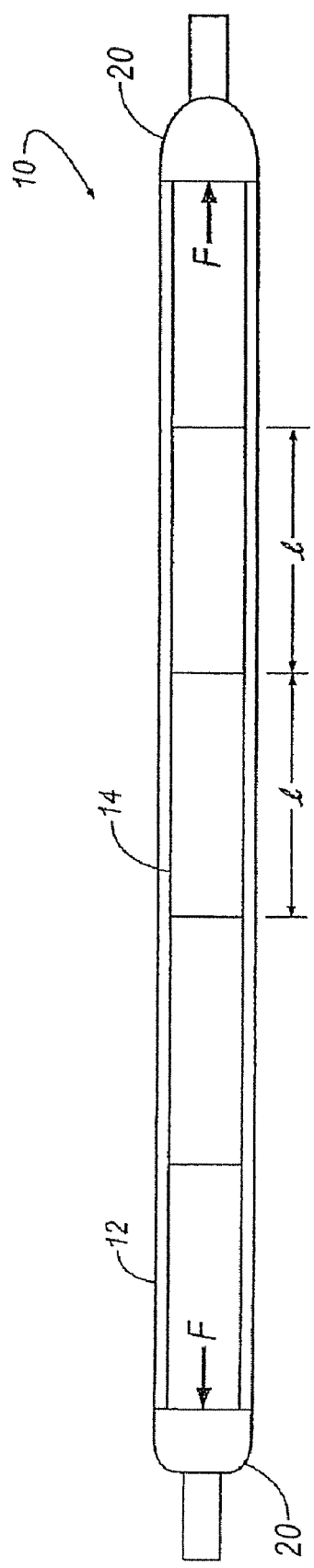
FIG. 3 is a cross-sectional view of a second embodiment of the propeller shaft assembly of FIG. 1 in tension.

While the claims are not limited to the illustrated embodiments, an appreciation of various aspects of the system is best gained through a discussion of various examples thereof. Referring now to the drawings, illustrative embodiments are shown in detail. Although the drawings represent the embodiments, the drawings are not necessarily to scale and certain features may be exaggerated to better illustrate and explain an innovative aspect of an embodiment. Further, the embodiments described herein are not intended to be exhaustive or otherwise limiting or restricting to the precise form and configuration shown in the drawings and disclosed in the following detailed description. Exemplary embodiments of the present invention are described in detail by referring to the drawings as follows.

Referring specifically to FIGS. 1 and 2, a shaft assembly 10 is illustrated according to an embodiment of the present disclosure. The shaft assembly 10 includes a shaft 12 and a plurality of internal tubes 14a, 14b, and 14c (collectively 14). In the embodiment, the shaft 12 comprises a hollow cylindrical shaft having a length, L that is defined by first and second ends 13a and 13b. Shaft 12 further includes an internal diameter, D.

Each internal tube 14 has an external diameter, d. According to an embodiment, the internal diameter D of the shaft 12 is slightly larger than the external diameter d of each internal tube 14.

According to an embodiment of the present invention, the shaft assembly 10 is assembled by inserting or placing each of the internal tubes 14 within a channel 15 defined by the walls of shaft 12. The internal tubes 14 are secured or connected together, for example, by providing a friction fit between adjacent internal tubes 14. The internal tubes 14 may be aligned in series, or sequentially, inside the shaft 12, such as with one end of an internal tube 14 abutting an end of an adjacent internal tube 14.

In one particular embodiment illustrated in FIG. 2, an end of tube 14b includes an outward projecting portion 16 that mates with and is received by a mating groove 18 that is formed on an end of tube 14a. Thus, when tube 14b is connected to an adjoining tube 14a, the tubes engage, connect or interlock. Tubes 14c are positioned on an either end of the series of internal tubes 14 and include one end having a mating fitting that cooperates with the configuration of the end of tube 14b while the other end of internal tubes 14c are generally flush to engage a stub shaft 20, to be explained below in greater detail.

Figure 4:
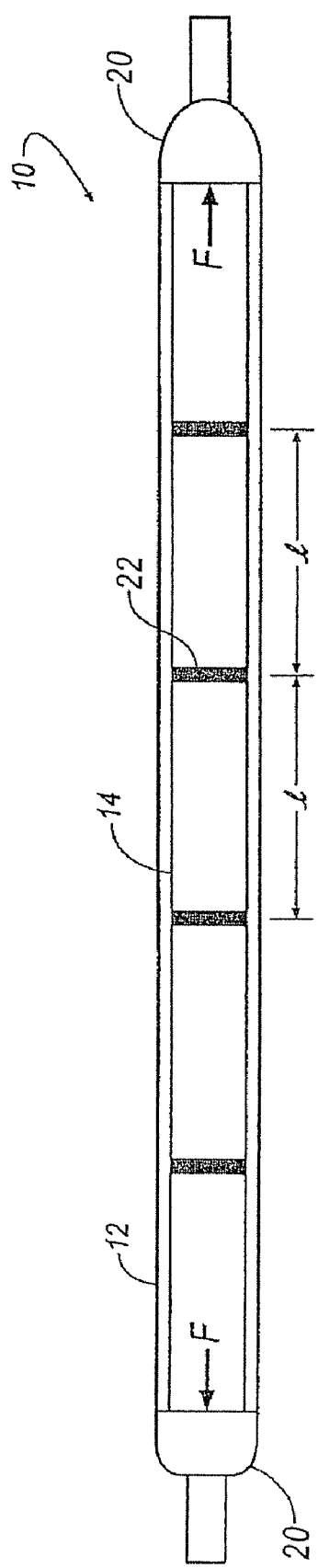
FIG. 4 is a cross-sectional view of a third embodiment of the propeller shaft assembly of FIG. 1 in tension.

Referring to FIG. 3, in another embodiment, the ends of successive internal tubes 14 may be positioned flush or substantially flush against one another, without interlocking. In a further alternative embodiment, as illustrated in FIG. 4, the internal tubes 14 may be spaced apart from one another with one or more spacers 22 inserted therebetween within shaft 12.

The spacers 22 may be located at predetermined spaced apart intervals within the shaft 12. The spacers 15 can be aligned between successive internal tubes 14 and, if desired, can cooperate or engage the ends of the internal tubes 14.

FIG. 5 illustrates another embodiment. In this embodiment, internal tubes 14a' and 14c', have an external diameter d (illustrated in FIG. 1) that is somewhat smaller than the internal diameter D (illustrated in FIG. 1) of shaft 12. Washers 24 are provided that engage around ends of internal tubes 14c' and 14a' that are not connected to the stub shaft 20. In one embodiment, the internal tubes 14a' and 14c' are spaced apart from one another with a connecting rod 26 being positioned therebetween. Connecting rod 26 is positioned within a groove 28 formed on the ends of internal tubes 14a' and 14c'. It is understood, however, that other configurations employing connecting rods 26 may be employed. For example, a series of internal tubes 14' may be positioned in one portion of shaft 12, with a single length of connecting rod 26 positioned in another portion. Other configurations are possible, as well.

FIG. 6 illustrates another embodiment wherein a single length of connecting rod 26 is positioned within shaft 12. One or more conical washers 24' are provided along the length of connecting rod 26. A washer 24 (illustrated in FIGS. 5 and 6) is positioned on an end portion of the connecting rod 26 where the stub shaft 20 connects to the shaft 12.

As mentioned above, the shaft 12 has a length, L. Each of the internal tubes 14, 14' and the connecting rods 26, 26', have an individual length, l, $l_1$. The length L of the shaft 12 is longer than each individual lengths l, $l_1$ of the internal tubes 14, 14' or connecting rods 26, 26'. The internal tubes 14, 14', including any spacers 15, have a cumulative length, C. Once the internal tubes 14 are placed in series inside the shaft 12, the cumulative length C of the internal tubes 14 is slightly longer than length L of the shaft 12. Similarly, the cumulative length C of the connecting rods 26 and the internal tubes 14', once assembled and placed inside the shaft 12, is also slightly longer than the length L of the shaft 12.

In the illustrated embodiment, the plurality of internal tubes 14 includes five internal tubes 14. However, it can be appreciated that the present invention may be practiced with any number of internal tubes 14, including only one internal tube 14, so long as the cumulative length C of the internal tube(s) 14, including any spacers, is longer than the length L of the shaft 12.

Once the internal tubes 14, 14' and/or the connecting rods 26, 26' are placed within the shaft 12, the shaft assembly 10 is placed between two stub shafts 20. The two stub shafts 20 are spaced apart by a distance that generally corresponds to the length L of the shaft 12. As a result, when the shaft assembly 10 is placed between the two stub shafts 20, the internal tubes 14, 14' and/or the connecting rods 26, 26' are compressed. The shaft 12 is then secured or connected to the two stub shafts 20 by welding, or other conventional connection methods.

Once the shaft assembly 10 is secured or connected within the two stub shafts 20, the internal tubes 14, 14' and connecting rods 26, 26' are generally biased to expand, thereby exerting a force, F, on the two stub shafts 16. Since the shaft 12 and the internal tubes 14, 14' and 26, 26' are secured together, the force, F, causes the shaft 12 to be in tension.

Among other things, placing the shaft 12 in tension desirably results in an increase in the natural, or bending resonant frequency, of the shaft 12. An equation for a beam (such as a propeller shaft) under tension is:

$$\omega = \frac{\pi^2}{l^2} \sqrt{\left(\frac{EI}{m}\left(p^4 + p^2 \frac{T}{T_{crit}}\right)\right)}$$

where
T is the applied tension,
l is the beam length,
E is Young's Modulus,
I is the area moment of inertia of the beam cross section about its central axis
M is the beam mass $$T_{crit} = \frac{\pi^2 EI}{l^2}$$

p is the pth natural frequency (or 1 for first bending)
and ω is the resulting natural frequency.

Since E, I, m, l, and p are all generally constants, the resulting natural frequency is substantially directly proportional to the square root of the applied tension. As such, the amount of tension placed upon the shaft 12 is directly proportional to the increase in the natural frequency.

The shaft assembly 10 of the present invention can provide advantages over conventional shaft assemblies. Because the natural frequency of the shaft 12 is directly proportional to the amount of tension experienced by the shaft 12, the natural frequency can be modified, tuned or adjusted in connection with the design of the shaft 12. For example, the shaft 12 may have a small diameter with a natural frequency similar to a larger diameter, or a single piece shaft may have the natural frequency that approximates to a multi-piece shaft assembly.

The preceding description has been presented only to illustrate and describe exemplary embodiments of the exhaust system according to the claimed invention. It is not intended to be exhaustive or to limit the invention to any precise form disclosed. It will be understood by those skilled in the art that various changes may be made and equivalents may be substituted for elements thereof without departing from the scope of the invention. In addition, many modifications may be made to adapt a particular situation or material to the teachings of the invention without departing from the essential scope. Therefore, it is intended that the invention not be limited to the particular embodiment disclosed as the best mode contemplated for carrying out this invention, but that the invention will include all embodiments falling within the scope of the claims. The invention may be practiced otherwise than is specifically explained and illustrated without departing from its spirit or scope. The scope of the invention is limited solely by the following claims.

What is claimed is:
1. A shaft assembly comprising:
    a generally hollow shaft having first and second ends, and
    a plurality of internal tubes, wherein the internal tubes are arranged in series inside the shaft, and configured to place the shaft under tension to control the natural frequency of the shaft, wherein the shaft has a predetermined length and the series of internal tubes has a cumulative length that is greater than the predetermined length of the shaft.
2. A shaft assembly according to claim 1, wherein the series of internal tubes are arranged such that an end of one internal tube of the series of internal tubes abuts an end of an adjacent internal tube of the series of internal tubes.

3. A shaft assembly according to claim 2, wherein the ends of successive internal tubes may be positioned flush or substantially flush against one another, without interlocking.

4. A shaft assembly according to claim 1, wherein a stub shaft is fixed onto each of the first and second ends of the shaft causing the series of internal tubes positioned within the shaft to compress elastically.

5. A shaft assembly according to claim 1, further including at least one spacer that is positioned between a pair of adjacent internal tubes.

6. A shaft assembly according to claim 5, wherein a spacer separates each adjacent internal tube such that the internal tubes and spacers are arranged in an alternating manner.

7. A shaft assembly according to claim 5, wherein the cumulative length of the at least one spacer and internal tubes is greater than the predetermined length of the shaft.

8. A shaft assembly according to claim 1, wherein an external diameter of the internal tubes is slightly less than an internal diameter of the shaft.

9. A shaft assembly comprising:
a generally hollow shaft having first and second ends, and
at least one internal tube positioned within the shaft so as to be adapted to place the shaft under tension, to control the natural frequency of the shaft;
wherein the at least one internal tube has an external diameter that is slightly smaller than an internal diameter of the shaft; and
at least one spacer positioned between a pair of adjacent at least one internal tubes, wherein the cumulative length of the at least one spacer and the at least one internal tube is greater than the length of the shaft.

10. A shaft assembly according to claim 9, wherein a stub shaft is fixed onto each of the first and second ends of the shaft causing the at least one internal tube positioned within the shaft to compress elastically.

* * * * *